United States Patent
Deurloo et al.

(10) Patent No.: US 8,671,745 B2
(45) Date of Patent: Mar. 18, 2014

(54) SHIFT-BY-WIRE DEFAULT-TO-PARK FUNCTIONAL VERIFICATION

(75) Inventors: Brian J. Deurloo, Howell, MI (US); William R. Goodwin, Farmington Hills, MI (US); Christopher L. Danks, Northville, MI (US); Louis A. Nagy, Canton, MI (US)

(73) Assignee: Ford Global Tehnologies, LLC, Dearborn, MI (US)

( * ) Notice: Subject to any disclaimer, the term of this patent is extended or adjusted under 35 U.S.C. 154(b) by 779 days.

(21) Appl. No.: 12/955,399

(22) Filed: Nov. 29, 2010

(65) Prior Publication Data

US 2012/0131993 A1    May 31, 2012

(51) Int. Cl.
 *G01M 13/02*    (2006.01)
(52) U.S. Cl.
 USPC .......................................... 73/115.03
(58) Field of Classification Search
 USPC ............... 73/115.01, 115.02, 115.03, 115.04
 See application file for complete search history.

(56) References Cited

U.S. PATENT DOCUMENTS

| | | | |
|---|---|---|---|
| 4,391,131 A * | 7/1983 | Scourtes | 73/115.02 |
| 5,954,179 A | 9/1999 | Osborn | |
| 6,481,274 B2 * | 11/2002 | Rankin | 73/115.02 |
| 6,688,448 B2 | 2/2004 | Giefer et al. | |
| 6,752,036 B2 | 6/2004 | Kropp et al. | |
| 2002/0139200 A1 * | 10/2002 | Rankin | 73/862.08 |
| 2008/0173121 A1 | 7/2008 | Kimura et al. | |
| 2009/0120160 A1 * | 5/2009 | Bosch et al. | 73/1.79 |
| 2009/0217782 A1 | 9/2009 | Wang | |

FOREIGN PATENT DOCUMENTS

| | | |
|---|---|---|
| EP | 1845495 | 10/2007 |
| JP | 2007276770 | 10/2007 |

\* cited by examiner

*Primary Examiner* — Eric S McCall
(74) *Attorney, Agent, or Firm* — James Dottavio; MacMillan, Sobanski & Todd, LLC

(57) ABSTRACT

A method for testing a transmission gear shift device includes using an electric machine and a primary mechanism to place the device and a secondary mechanism, latched to the primary mechanism, in a park position, using a motor to delatch the secondary mechanism from the primary mechanism, using the electric machine to absorb energy released by a spring when delatching, and using the electric machine to relatch the secondary mechanism to the primary mechanism.

24 Claims, 3 Drawing Sheets

SHIFT-BY-WIRE DEFAULT-TO-PARK FUNCTIONAL VERIFICATION

BACKGROUND OF THE INVENTION

1. Field of the Invention

This invention relates generally to electrical shift-by-wire selection of a desired transmission operating range, and more particularly to a method for testing operation of the park failsafe portion of a shift-by-wire system.

2. Description of the Prior Art

In a conventional automatic transmission system for a motor vehicle, a direct mechanical linkage connects the driver operated gear shift lever, whose movement actuates the transmission gear shift mechanism through a cable.

In a shift-by-wire system this direct linkage is separated from the driver, and an electronic system that includes solenoids or motors may be used to produce the intended position of the gear shift mechanism. In such an electronic system, redundant systems are sometimes applied to ensure functionality under unexpected conditions. These systems would typically apply some form of secondary mechanical or hydraulic system that operates upon the failure of the primary function of the system.

A key challenge is to provide proper verification of the secondary system to ensure its functionality before using the system under a condition where the function is absolutely necessary.

In the case of a system that uses stored mechanical energy, operation of the secondary system can be difficult due to the difference in audible characteristics and response time differences. The nature of this response could raise user concerns that something abnormal occurred.

A need exists for an improved method that verifies the system without creating new problems by testing a backup system. The method should ensure that, during verification testing, the actuator assembly remains in the intended gear level position without unintentionally producing an unintended gear position.

The specific mechanism being considered for this proposal is an electro-mechanical backup system which uses a torsion spring of sufficient capacity that can return the system back to a gearshift park state independent of the primary functional system.

SUMMARY OF THE INVENTION

A method for testing a transmission gear shift device includes using an electric machine and a primary mechanism to place the device and a secondary mechanism, latched to the primary mechanism, in a park position, using a motor to delatch the secondary mechanism from the primary mechanism, using the electric machine to absorb energy released by a spring when delatching, and using the electric machine to relatch the secondary mechanism to the primary mechanism.

By using the electric motors as a resistance for a return-to-park spring to push against, the mechanism trips noiselessly and relatches to verify that the mechanical components are not degraded.

The system is able to keep the vehicle in Park until the verification test is completed, thereby avoiding need for human intervention or surveillance during the test.

The electromechanical system uses a torsion spring, which has sufficient capacity to return the system back to a gearshift park state independently of the primary functional system.

The method provides for operation of the secondary, or failsafe mechanism while maintaining the park position throughout the test.

The test of the secondary, failsafe mechanism can be performed while maintaining the shift device in the Park position or releasing from any of the gear states park P, neutral N, reverse R, or drive D.

The electric machines are used as motors to latch the mechanism and as generators to absorb excess energy of the torsion spring when delatching occurs.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1A:
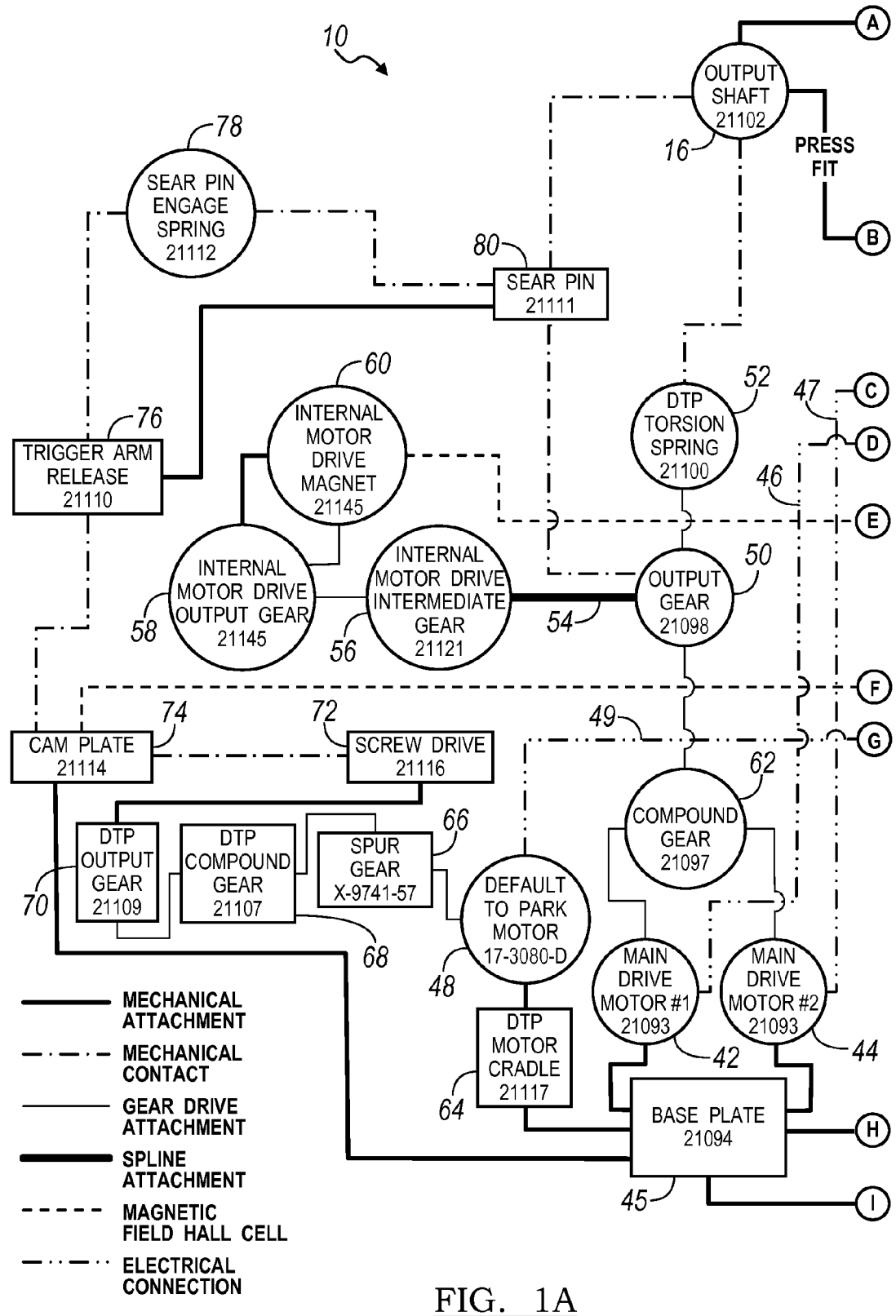
FIGS. 1A and 1B comprise a schematic diagram of a transmission range control module.
Figure 1B:
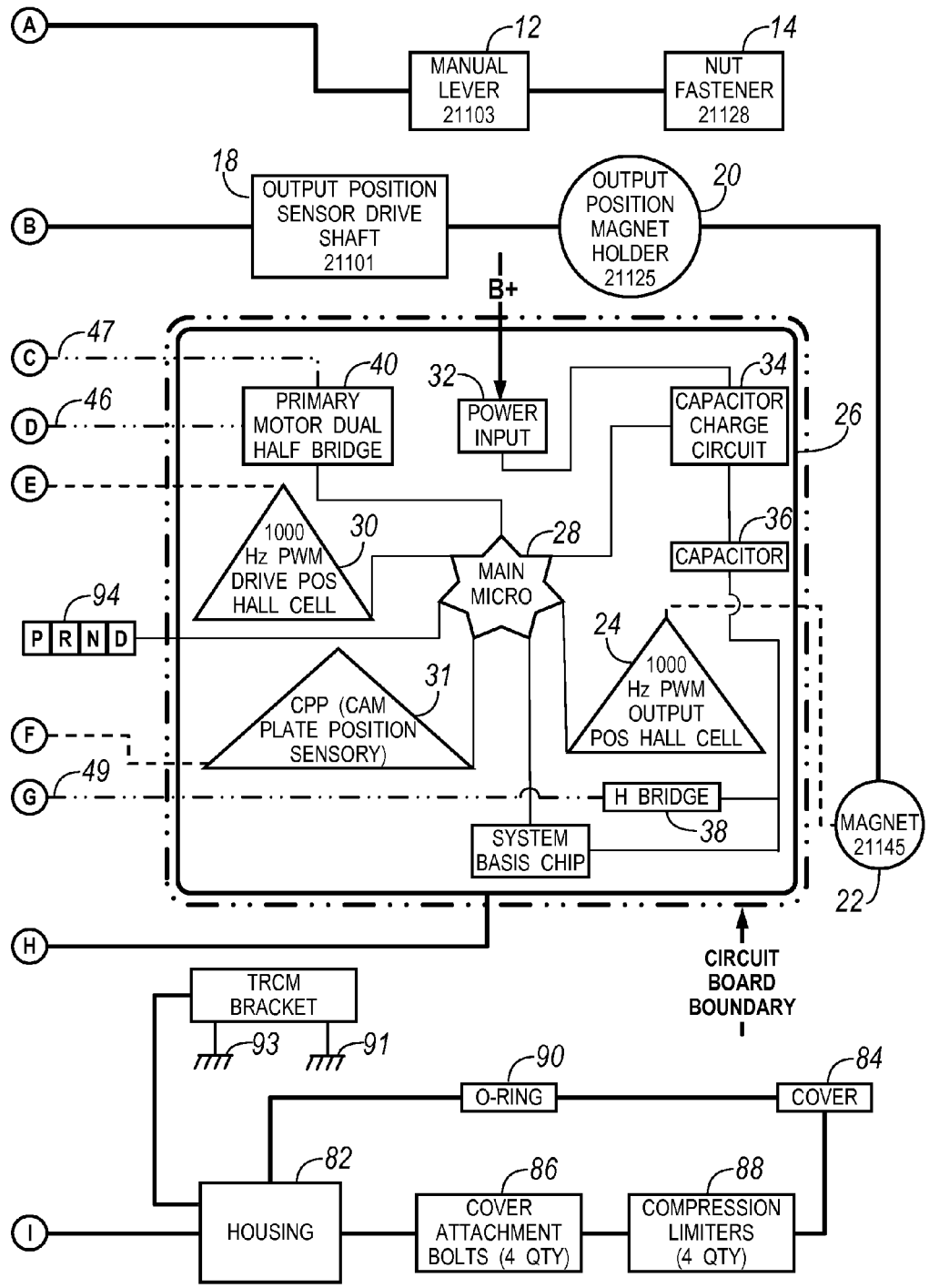

Referring now to FIG. 1, a transmission range control module (TRCM) 10 includes a manual lever 12 fastened by a nut to an output shaft 16, an output position sensor drive shaft 18 attached by a press fit to shaft 16 and mechanically attached to an output position magnet holder 20, which contains a magnet 22, whose field is adjacent a 1000 Hz PWM output position Hall cell 24, mounted on a circuit board 26.

Also mounted on the circuit board 26 are a microprocessor 28, a 1000 Hz PWM drive position Hall cell 30, cam plate position sensor 31, power input unit 32, capacitor charge circuit 34, a bank of capacitors 36, H-bridge 38, and a primary electric machine dual half bridge 40. Main drive electric machines 42, 44, supported on a base plate 45, are electrically connected to the primary dual half bridge 40 through conductors 46, 47. A default to park motor 48, also supported on the base plate 45, is electrically connected to the H-bridge 38 through conductor 49.

An output gear 50, connected mechanically through a torsion spring 52 to output shaft 16, is connected by a spline 54 to an internal motor drive intermediate gear 56, which is engaged with an internal motor drive output gear 58. An internal motor drive magnet 60, mechanically attached to the internal motor drive output gear 58, is located adjacent the drive position Hall cell 30.

Main drive machines 42, 44 are connected by a gear drive to a compound gear 62, which is connected by a gear drive to the output gear 50, such that a continuous drive connection exists between the main drive machines 42, 44 and output gear 50 through compound gear 62. Output shaft 16 is alternately latched to output gear 50, such that they rotate as a unit, and unlatched from output gear 50, such that they rotate mutually independently.

A primary mechanism of TRCM 10 for actuating manual lever 12 includes the main drive electric machines 42, 44, compound gear 62, output gear 50, torsion spring 52, and output shaft 16.

The force produced by torsion spring 52 biases output shaft 16 to the Park position and biases the drive train comprising output gear 50, compound gear 60 and machines, 42, 44 in the opposite rotary direction to the Drive position. If power from the vehicle's electric battery is absent and the (TRCM) 10 is not in the Park position, spring 52 returns the output shaft 16 to the Park position.

The default-to-park (DTP) motor 48, which is supported on the base plate 45 in a DPT motor cradle 64, is driveably connected through a series of gear meshes including spur gear 66, DTP compound gear 68 and DTP output gear 70. A screw drive 72 connected through a series of mechanical attachments including CAM plate 74, trigger arm release 76 and sear pin engage spring 78 to a sear pin 80. Sear pin 80 provides a mechanical connection between output shaft 16 and output gear 50.

A secondary mechanism of TRCM 10 for actuating manual lever 12 includes the default-to-park motor 48, spur gear 66, DTP compound gear 68, DTP output gear 70, screw drive 72, CAM plate 74, trigger arm release 76, sear pin engage spring 78 and sear pin 80. When the primary and secondary mechanisms are latched sear pin 80 provides a mechanical connection between output shaft 16 and output gear 50, such that the primary and secondary mechanisms rotate as a unit. When the primary and secondary mechanisms are unlatched sear pin 80 disconnects the secondary mechanism from the primary mechanism at the output gear 50, thereby allowing the primary and secondary mechanisms to rotate independently.

The components of the TRCM 10 located is a space contained by a die cast housing 82 and cover 84, which is connected by bolts 86 and compression limiters 88 to housing 82. The interface between cover 84 and housing 82 is sealed by an O-ring 90.

The TRCM 10 pivots manual lever 12 between a Drive stop position 91, a Park stop position 93. These stops are preferably located on a bracket (not shown) attached to housing 82, each stop position corresponding to the Drive overtravel and Park overtravel transmission ranges, respectively.

A gear shift module 94, located in the passenger compartment of the vehicle, is operated manually by the vehicle operator, who selects the desired transmission range by depressing a button corresponding to the desired range: Park (P), Reverse (R), Neutral (N), Drive (D) and Low (L).

When the drive mechanism comprising torsion spring 52, output gear 50 and compound gear 62 become unlatched from output shaft 16, spring 52 abruptly releases a large magnitude of potential energy stored in the spring. To resist this energy release, the terminals of drive machines 42, 44 are connected such that the machines operate as generators absorbing the released energy and avoiding noise that otherwise would be produced by the delatching.

The secondary mechanism driven by DTP motor 48 and actuated by capacitors 36 delatches the drive mechanism, such that DTP motor 48 drives spur gear 66, DTP compound gear 68, DPT output gear 70 and screw drive 72. CAM plate 74 translates when driven by screw drive 72, causing the trigger release arm 76, located in a track in the CAM plate 74, to trip sear pin 80 and disengage output shaft 16 from output gear 50.

Figure 2:
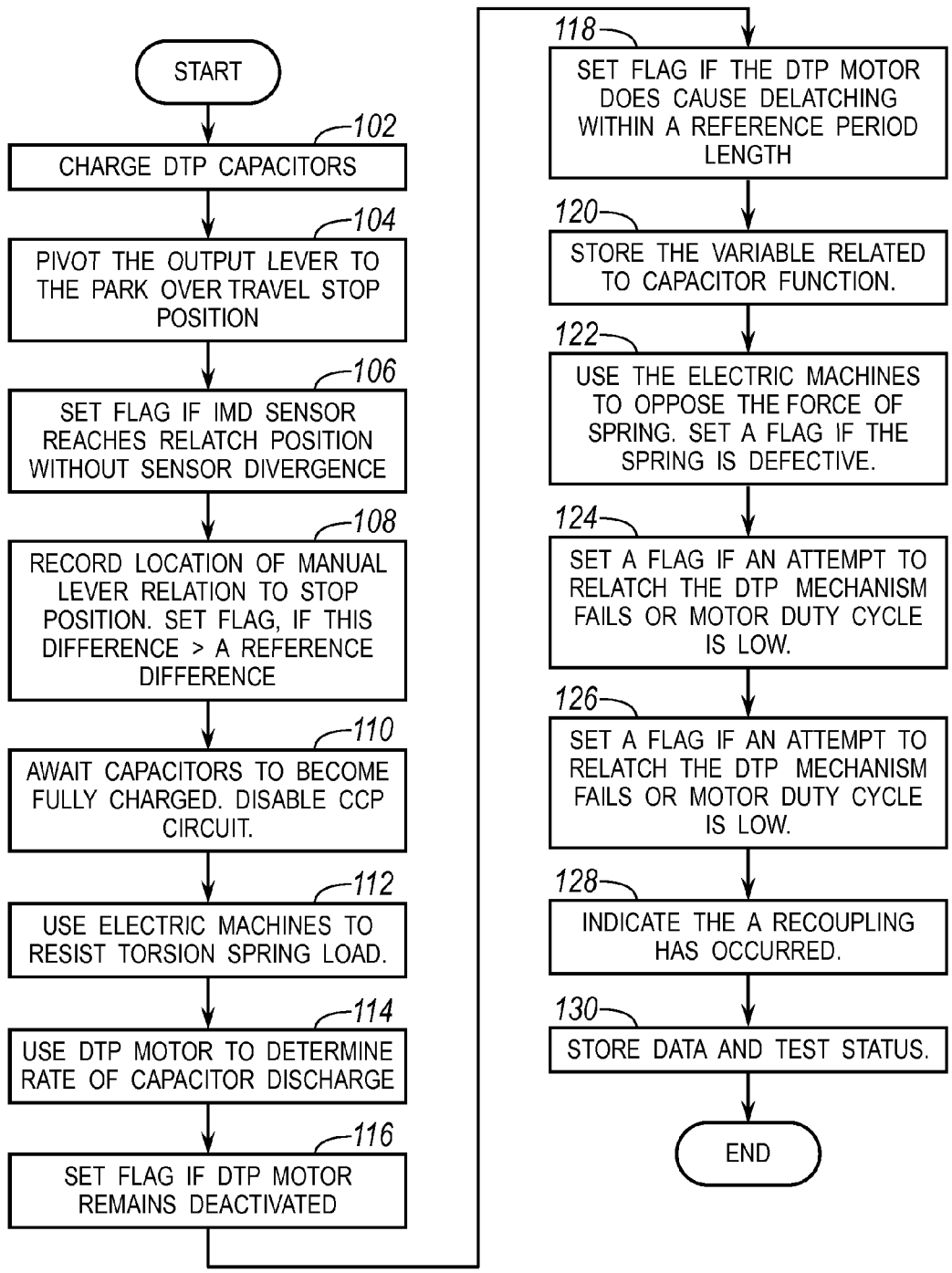
FIG. 2 is diagram showing the steps of a method for verification testing the transmission range control module of FIG. 1.

Periodically, it may be necessary to test the return-to-park mechanism of the TRCM 10 system. This test is initiated through as special command issued from a powertrain control module (PCM), and will be accepted only if the TRCM 10 is already in the Park position. The test is conducted under control of an algorithm comprising the steps illustrated in FIG. 2.

At step 102 a capacitor charge pump (CCP) is activated to bring the DTP capacitors 36 to full charge.

At step 104, the manual lever arm 12 is pivoted to the TRCM Park overtravel stop position 93, whose location may be determined by measuring the difference between the signals produced by output lever arm (OA) sensor 24 and internal motor drive (IMD) sensor 30. When the IMD sensor 30 begins to diverge from the OA sensor 24 in the Park direction by a calibrateable amount (about 0.4%), the OA sensor 24 has reached the overtravel stop.

At step 106, if the IMD sensor 30 reaches the calibrated relatch point without the position indicated by sensors 24, 30 diverging, the DTP test has failed and a flag is set to warn of the failure and the nature of the failure.

At step 108, record the measured location of the manual lever arm 12 relative to the overtravel stop position as a new learned value. If this value exceeds the nominal position by a calibrateable reference distance (about 0.5%), the DTP test has failed.

At step 110, await capacitors 36 to reach a calibrated voltage for full charge, preferably about 25V, and disable the CCP circuitry to allow monitoring of capacitor discharge during the DTP trigger.

At step 112, the main drive machines 42, 44 are placed in a dynamic braking mode wherein they resist the spring response on the IMD geartrain.

At step 114, activate the DTP motor 48 to decouple output gear 50 from output shaft 16 and monitor capacitors 36 discharge characteristics. Monitor the length of the period required for capacitors 36 to discharge from 25V to $V_{batt}$ and calculate the rate of discharge. This provides an instantaneous measure of capacitor health. If the discharge is faster than a calibratable value (about 500 ms), the DTP test has failed.

At step 116, if the cam plate position sensor 31 does not indicate a change in position within a calibrateable reference period length (about 100 ms), the DTP test has failed and normal operation resumes.

At step 118, if the cam plate position sensor 31 indicates that the DTP motor 48 is activated and the DTP motor 48 does not cause the sear pin 80 to unlatch within a calibrateable reference period length (about 1.5 sec), the DTP test has failed.

At step 120, parameters related to the function of capacitors 36 are stored electronically, preferably in nonvolatile RAM (NVRAM), for continuous reporting to a powertrain control module (PCM) diagnostic function.

At step 122, after a delatching has been detected, the main electric machines 42, 44, operating as motors, are reactivated with a calibrateable reference duty cycle (about 20%) to oppose the torsion spring 52 that is pushing the IMD gear train toward the Drive position. Wait for the position indicated by IMD sensor 30 to stabilize IMD sensor position 30 can be used to determine integrity of spring 52. If the final resting position does not fall within a calibrateable reference range or the relatch point is reached, the DTP test has failed, thereby indicating that the torsion spring 52 is defective or its structural integrity is compromised.

At step 124, the main electric machines 42, 44 operating as motors are used to attempt to relatch the DTP mechanism. If the DTP mechanism does not relatch, preferably on the first attempt, or if the required duty cycle is less than a calibrateable value (about 30%), the DTP test has failed.

At step 126, relatching is confirmed by using machines 42, 44 to drive the manual output lever 12 to the nominal Park position and checking that the output of both sensors 24, 30 match within a calibrateable reference range (about 0.5%). Otherwise, the DTP test has failed.

At step 128, the TRCM 10 issues a signal to the PCM confirming that a successful relatching has occurred, if the output of both sensors 24, 30 match within a the reference range when the manual output lever 12 is in the nominal Park position.

At step 130, data representing (i) date and time of the test, (ii) capacitor function, (iii) location of the Park overtravel position, (iv) IMD motor current and duty cycle required to relatch, and (v) the pass/fail status of the test are stored preferably in non-volatile RAM.

The DPT torsion spring 52 stores mechanical energy, which is released through the operation of the DTP motor 48 when the mechanical latch is released. The electric machines 42, 44, when acting as motors drive the primary movement mechanism, and when acting as generators absorb energy released by the torsion spring 52 when a delatch occurs. Two sensors 24, 30 verify the primary and secondary mechanism positions independently of one another.

In accordance with the provisions of the patent statutes, the preferred embodiment has been described. However, it should be noted that the alternate embodiments can be practiced otherwise than as specifically illustrated and described.

The invention claimed is:

1. A method for testing a transmission gear shift device, comprising:
   (a) using an electric machine and a primary mechanism to place the device and a secondary mechanism, latched to the primary mechanism, in a park position;
   (b) using a motor to delatch the secondary mechanism from the primary mechanism;
   (c) using the electric machine to absorb energy released by a spring when delatching;
   (d) using the electric machine to relatch the secondary mechanism to the primary mechanism.

2. The method of claim 1, wherein:
   step (a) further comprises using the electric machine as a motor; and
   step (c) further comprises using the electric machine as a generator.

3. The method of claim 1, wherein step (a) further comprises:
   using a first sensor responsive to rotation of the primary mechanism to indicate a location of a park overtravel stop position;
   using a second sensor responsive to rotation of the secondary mechanism to indicate a location of a park stop position;
   producing an indication of a test failure, if the indicated position produced by the second sensor differs from the indicated position produced by the second sensor by more than a reference amount.

4. The method of claim 1, wherein step (b) further comprises:
   using a charged capacitor to actuate the motor;
   monitoring a rate of discharge of the capacitor while actuating the motor;
   if said rate is faster than a reference rate, producing an indication of a test failure.

5. The method of claim 1, wherein step (b) further comprises:
   using a fully charged capacitor to actuate the motor;
   monitoring a rate of discharge of said capacitor to a battery voltage while actuating the motor;
   if said rate is faster than a reference rate, producing an indication of a test failure.

6. The method of claim 1, wherein step (b) further comprises:
   using a sensor responsive to the secondary mechanism to indicate a delatching of the secondary mechanism from the primary mechanism;
   producing an indication of a test failure, if said sensor does not indicate a change in position of the secondary mechanism within a reference period length.

7. The method of claim 1, wherein step (b) further comprises:
   producing an indication of a test failure, if the motor is activated and the secondary mechanism does not delatch from the primary mechanism during a reference period.

8. The method of claim 1, wherein steps (b) and (c) further comprise:
   after producing a delatching, using said spring to force the secondary mechanism toward a drive park position in opposition to the electric machines;
   using a sensor responsive to rotation of the secondary mechanism to define a drive position of the secondary mechanism;
   using a sensor responsive to rotation of the secondary mechanism to define a position of the secondary mechanism while the spring force is applied after a delatching occurs;
   producing an indication of a test failure, if a final position of the secondary mechanism while the spring force is applied after a delatching occurs differs from the delatch position by more than reference distance.

9. The method of claim 1, wherein step (d) further comprises:
   producing an indication of a test failure, if a relatching of the secondary mechanism to the primary mechanism is not detected.

10. The method of claim 1, wherein step (d) further comprises:
    producing an indication of a test failure, if the relatching does not occur on a first attempt.

11. The method of claim 1, wherein step (d) further comprises:
    actuating the electric machine with a duty cycle;
    producing an indication of a test failure, if a duty cycle required to produce the relatching is less than a reference duty cycle.

12. The method of claim 1, further comprising:
    using the electric machine and the primary mechanism to place the device and a secondary mechanism, latched to the primary mechanism, in the park position;
    using a first sensor responsive to rotation of the primary mechanism to indicate a location of a park stop position of the device;
    using a second sensor responsive to rotation of the secondary mechanism to indicate a location of a park stop position of the device;
    producing an indication of a test failure, if the indicated park stop position produced by the second sensor differs from the indicated park stop position produced by the second sensor by more than a second reference amount.

13. A method for testing a transmission shift device, comprising:
    (a) using an electric machine and a primary mechanism to place the device in an overtravel park stop position, and a secondary mechanism, latched to the primary mechanism, in a park stop position;

(b) delatching the secondary mechanism from the primary mechanism;
(c) using the electric machine to absorb energy released by a spring when delatching;
(d) using the electric machine to relatch the secondary mechanism to the primary mechanism.

14. The method of claim 13, wherein:
step (a) further comprises using the electric machine as a motor; and
step (c) further comprises using the electric machine as a generator.

15. The method of claim 13, wherein step (a) further comprises:
using a first sensor responsive to rotation of the primary mechanism to indicate a location of the park overtravel stop position;
determining a relatch position of the secondary mechanism;
using a second sensor responsive to rotation of the secondary mechanism to indicate a location of a park stop position;
producing an indication of a test failure, if the indicated position produced by the second sensor reaches said relatch position without the indicated position produced by the first sensor diverging from that of the second sensor as the primary mechanism moves past the relatch position to the park overstop position.

16. The method of claim 13, wherein step (b) further comprises:
using a charged capacitor to actuate the motor;
monitoring a rate of discharge of the capacitor while actuating the motor;
if said rate is faster than a reference rate, producing an indication of a test failure.

17. The method of claim 13, wherein step (b) further comprises:
using a fully charged capacitor to actuate the motor;
monitoring a rate of discharge of said capacitor to a battery voltage while actuating the motor;
if said rate is faster than a reference rate, producing an indication of a test failure.

18. The method of claim 13, wherein step (b) further comprises:
using a sensor responsive to rotation of the secondary mechanism to indicate a delatching of the secondary mechanism from the primary mechanism;
producing an indication of a test failure, if an indicated position produced by the second sensor following a delatching does not indicate a changed position within a reference period length following a delatching.

19. The method of claim 13, wherein step (b) further comprises:
producing an indication of a test failure, if the motor is activated and the secondary mechanism does not delatch during a calibrateable reference period.

20. The method of claim 13, wherein steps (b) and (c) further comprise:
after producing a delatching, using said spring to force the secondary mechanism toward a drive position in opposition to the electric machines;
using a sensor responsive to rotation of the secondary mechanism to define a drive position of the secondary mechanism;
using a sensor responsive to rotation of the secondary mechanism to define a position of the secondary mechanism while the spring force is applied after a delatching occurs;
producing an indication of a test failure, if a final position of the secondary mechanism while the spring force is applied after a delatching occurs differs from the delatch position by more than reference distance.

21. The method of claim 13, wherein step (d) further comprises:
producing an indication of a test failure, if a relatching of the secondary mechanism to the primary mechanism is not detected.

22. The method of claim 13, wherein step (d) further comprises:
producing an indication of a test failure, if the relatching does not occur on a first attempt.

23. The method of claim 13 wherein step (d) further comprises:
actuating the electric machine with a duty cycle;
producing an indication of a test failure, if a duty cycle required to produce the relatching is less than a reference duty cycle.

24. The method of claim 13, further comprising:
using the electric machine and the primary mechanism to place again the device and a secondary mechanism, latched to the primary mechanism, in the park position;
using a first sensor responsive to rotation of the primary mechanism to indicate a location of a park nominal position of the device;
using a second sensor responsive to rotation of the secondary mechanism to indicate a location of a park nominal position of the device;
producing an indication of a test failure, if the indicated park nominal position produced by the second sensor differs from the indicated park nominal position produced by the second sensor by more than a second reference amount.

* * * * *